(12) United States Patent
Fein et al.

(10) Patent No.: US 8,386,585 B2
(45) Date of Patent: Feb. 26, 2013

(54) REAL-TIME COMMUNICATIONS OVER DATA FORWARDING FRAMEWORK

(75) Inventors: Gene Fein, Malibu, CA (US); Edward Merritt, Lenox, MA (US)

(73) Assignee: Tajitshu Transfer Limited Liability Company, Wilmington, DE (US)

( * ) Notice: Subject to any disclaimer, the term of this patent is extended or adjusted under 35 U.S.C. 154(b) by 194 days.

(21) Appl. No.: 12/989,638

(22) PCT Filed: Apr. 27, 2009

(86) PCT No.: PCT/US2009/041817
§ 371 (c)(1),
(2), (4) Date: Feb. 25, 2011

(87) PCT Pub. No.: WO2009/132345
PCT Pub. Date: Oct. 29, 2009

(65) Prior Publication Data
US 2011/0167131 A1    Jul. 7, 2011

Related U.S. Application Data

(63) Continuation of application No. 12/109,458, filed on Apr. 25, 2008, now abandoned.

(51) Int. Cl.
*G06F 15/16* (2006.01)
(52) U.S. Cl. ...................................................... 709/217
(58) Field of Classification Search .................. 709/206, 709/212, 217, 238
See application file for complete search history.

(56) References Cited

U.S. PATENT DOCUMENTS

| | | | |
|---|---|---|---|
| 3,786,424 A | 1/1974 | McVoy et al. | |
| 5,751,928 A | 5/1998 | Bakalash | |
| 5,787,258 A | 7/1998 | Costa et al. | |
| 5,978,839 A | 11/1999 | Okuhara et al. | |
| 6,085,030 A | 7/2000 | Whitehead et al. | |
| 6,151,395 A | 11/2000 | Harkins | |
| 6,205,478 B1 | 3/2001 | Sugano et al. | |
| 6,219,691 B1 * | 4/2001 | Youn | 709/200 |
| 6,260,159 B1 | 7/2001 | Garnett et al. | |
| 6,298,380 B1 | 10/2001 | Coile et al. | |
| 6,505,213 B1 | 1/2003 | Kamada et al. | |

(Continued)

FOREIGN PATENT DOCUMENTS

| | | |
|---|---|---|
| EP | 0 458 567 | 5/1991 |
| EP | 0 722 591 | 6/1999 |

(Continued)

OTHER PUBLICATIONS

Akasaka, Tsutomu, "Remote Copy Technology of ETERNUS6000 and ETERNUS3000 Disk Arrays", Fujitsu Sci. Tech. J., Jan. 2006, vol. 42, Issue 1, pp. 9-16.

(Continued)

*Primary Examiner* — Jerry Dennison
(74) *Attorney, Agent, or Firm* — Knobbe, Martens, Olson & Bear LLP

(57) ABSTRACT

Methods and apparatus, including computer program products, for real-time communications over data forwarding framework. A framework includes a group of interconnected computer system nodes each adapted to receive data and continuously forward the data from computer memory to computer memory without storing on any physical storage device in response to a request from a client system to store data from a requesting system and retrieve data being continuously forwarded from computer memory to computer memory in response to a request to retrieve data from the requesting system, and at least two client systems linked to the group, each of the client systems executing a real-time communications client program.

18 Claims, 3 Drawing Sheets

U.S. PATENT DOCUMENTS

| | | |
|---|---|---|
| 6,549,957 B1 | 4/2003 | Hanson et al. |
| 6,587,866 B1 | 7/2003 | Modi et al. |
| 6,650,640 B1 | 11/2003 | Muller et al. |
| 6,677,976 B2 | 1/2004 | Parker et al. |
| 6,684,258 B1 | 1/2004 | Gavin et al. |
| 6,721,275 B1 | 4/2004 | Rodeheffer et al. |
| 6,724,767 B1 | 4/2004 | Chong et al. |
| 6,745,289 B2 | 6/2004 | Gruner et al. |
| 6,907,447 B1 | 6/2005 | Cooperman et al. |
| 6,941,338 B1 | 9/2005 | Madsen |
| 6,983,303 B2 | 1/2006 | Pellegrino et al. |
| 6,985,476 B1 | 1/2006 | Elliott et al. |
| 7,007,142 B2 | 2/2006 | Smith |
| 7,035,933 B2 | 4/2006 | O'Neal et al. |
| 7,043,530 B2 | 5/2006 | Isaacs et al. |
| 7,061,923 B2 | 6/2006 | Dugan et al. |
| 7,103,824 B2 | 9/2006 | Halford |
| 7,120,631 B1 | 10/2006 | Vahalia et al. |
| 7,136,638 B2 | 11/2006 | Wacker et al. |
| 7,143,170 B2 | 11/2006 | Swildens et al. |
| 7,191,298 B2 | 3/2007 | Kaminsky et al. |
| 7,197,576 B1 | 3/2007 | Lo et al. |
| 7,209,973 B2 | 4/2007 | Tormasov et al. |
| 7,240,214 B2 | 7/2007 | Gazzetta et al. |
| 7,266,776 B2 | 9/2007 | Quillen et al. |
| 7,274,706 B1 | 9/2007 | Nguyen et al. |
| 7,277,941 B2 | 10/2007 | Ignatius et al. |
| 7,295,556 B2 | 11/2007 | Roese et al. |
| 7,320,059 B1 | 1/2008 | Armangau et al. |
| 7,327,731 B1 | 2/2008 | Kumar et al. |
| 7,346,063 B1 | 3/2008 | Herbst |
| 7,346,909 B1 | 3/2008 | Eldar et al. |
| 7,356,540 B2 | 4/2008 | Smith et al. |
| 7,356,567 B2 | 4/2008 | Odell et al. |
| 7,363,316 B2 | 4/2008 | Anderson et al. |
| 7,366,868 B2 | 4/2008 | Reuter et al. |
| 7,404,002 B1 | 7/2008 | Pereira |
| 7,424,514 B2 | 9/2008 | Noble et al. |
| 7,426,471 B1 | 9/2008 | Briscoe et al. |
| 7,426,574 B2 | 9/2008 | Liao |
| 7,426,637 B2 | 9/2008 | Risan et al. |
| 7,426,745 B2 | 9/2008 | McCarty |
| 7,428,219 B2 | 9/2008 | Khosravi |
| 7,428,540 B1 | 9/2008 | Coates et al. |
| 7,430,584 B1 | 9/2008 | Fein et al. |
| 7,529,784 B2 | 5/2009 | Kavuri et al. |
| 7,599,997 B1 | 10/2009 | Fein et al. |
| 7,631,051 B1 | 12/2009 | Fein et al. |
| 7,631,052 B2 | 12/2009 | Fein et al. |
| 7,636,758 B1 | 12/2009 | Fein et al. |
| 7,636,759 B1 | 12/2009 | Fein et al. |
| 7,636,760 B1 | 12/2009 | Fein et al. |
| 7,636,761 B1 | 12/2009 | Fein et al. |
| 7,636,762 B1 | 12/2009 | Fein et al. |
| 7,636,763 B1 | 12/2009 | Fein et al. |
| 7,636,764 B1 | 12/2009 | Fein et al. |
| 7,668,926 B2 | 2/2010 | Fein et al. |
| 7,668,927 B2 | 2/2010 | Fein et al. |
| 7,673,009 B2 | 3/2010 | Fein et al. |
| 7,685,248 B1 | 3/2010 | Fein et al. |
| 7,844,695 B2 | 11/2010 | Fein et al. |
| 7,877,456 B2 | 1/2011 | Fein et al. |
| 7,924,888 B2 | 4/2011 | Schultze et al. |
| 2002/0158899 A1 | 10/2002 | Raymond |
| 2002/0194371 A1 | 12/2002 | Kadoi |
| 2003/0093463 A1* | 5/2003 | Graf .................. 709/203 |
| 2003/0101200 A1 | 5/2003 | Koyama et al. |
| 2003/0137880 A1 | 7/2003 | Barrenscheen et al. |
| 2003/0158958 A1 | 8/2003 | Chiu |
| 2004/0064633 A1 | 4/2004 | Oota |
| 2004/0093390 A1 | 5/2004 | Oberdorfer |
| 2004/0165525 A1 | 8/2004 | Burak |
| 2004/0223503 A1 | 11/2004 | Lynch et al. |
| 2004/0250029 A1 | 12/2004 | Ji et al. |
| 2005/0010647 A1 | 1/2005 | Durham |
| 2005/0010685 A1* | 1/2005 | Ramnath et al. .............. 709/238 |
| 2005/0015466 A1 | 1/2005 | Tripp |
| 2005/0044162 A1 | 2/2005 | Liang et al. |
| 2005/0071568 A1 | 3/2005 | Yamamoto et al. |
| 2005/0201409 A1 | 9/2005 | Griswold et al. |
| 2005/0216473 A1 | 9/2005 | Aoyagi |
| 2005/0216727 A1 | 9/2005 | Chattopadhyay et al. |
| 2005/0240749 A1 | 10/2005 | Clemo et al. |
| 2005/0243823 A1 | 11/2005 | Griswold et al. |
| 2006/0031593 A1 | 2/2006 | Sinclair |
| 2006/0091007 A1 | 5/2006 | Inoue et al. |
| 2006/0095512 A1 | 5/2006 | Noma |
| 2006/0143505 A1 | 6/2006 | Olarig |
| 2006/0159456 A1 | 7/2006 | Gumaste et al. |
| 2006/0209822 A1 | 9/2006 | Hamamoto et al. |
| 2006/0212551 A1 | 9/2006 | Kao et al. |
| 2006/0242212 A1 | 10/2006 | Brinkmann et al. |
| 2007/0005694 A1 | 1/2007 | Popkin et al. |
| 2007/0011097 A1 | 1/2007 | Eckleder |
| 2007/0050446 A1 | 3/2007 | Moore |
| 2007/0050761 A1 | 3/2007 | Hester et al. |
| 2007/0055765 A1 | 3/2007 | Lisiecki et al. |
| 2007/0058606 A1 | 3/2007 | Koskelainen |
| 2007/0073965 A1 | 3/2007 | Rajakarunanayake |
| 2007/0079087 A1 | 4/2007 | Wang et al. |
| 2007/0186068 A1 | 8/2007 | Agrawal |
| 2007/0195772 A1 | 8/2007 | Shadish |
| 2007/0214105 A1 | 9/2007 | Sfarti et al. |
| 2007/0266220 A1 | 11/2007 | Nelson |
| 2007/0271349 A1 | 11/2007 | Clemo et al. |
| 2008/0013448 A1 | 1/2008 | Horie et al. |
| 2008/0016564 A1 | 1/2008 | Claudatos et al. |
| 2008/0037777 A1 | 2/2008 | Ignatius et al. |
| 2008/0059495 A1 | 3/2008 | Kiessig et al. |
| 2008/0071855 A1 | 3/2008 | Farber et al. |
| 2008/0084330 A1 | 4/2008 | Picard |
| 2008/0091744 A1 | 4/2008 | Shitomi et al. |
| 2008/0095075 A1 | 4/2008 | Monier |
| 2008/0101277 A1 | 5/2008 | Taylor et al. |
| 2008/0104085 A1 | 5/2008 | Papoutsakis et al. |
| 2008/0114891 A1 | 5/2008 | Pereira |
| 2008/0144655 A1 | 6/2008 | Beam et al. |
| 2008/0151893 A1 | 6/2008 | Nordmark et al. |
| 2008/0155094 A1 | 6/2008 | Roese et al. |
| 2008/0155252 A1 | 6/2008 | Nambiar |
| 2008/0155275 A1 | 6/2008 | Natarajan et al. |
| 2008/0155537 A1 | 6/2008 | Dinta et al. |
| 2008/0181224 A1 | 7/2008 | Van Hensbergen et al. |
| 2008/0222415 A1 | 9/2008 | Munger et al. |
| 2008/0222492 A1 | 9/2008 | Earhart et al. |
| 2008/0225842 A1 | 9/2008 | Goldfein et al. |
| 2008/0225888 A1 | 9/2008 | Valluri et al. |
| 2008/0228943 A1 | 9/2008 | Balus et al. |
| 2008/0313318 A1 | 12/2008 | Vermeulen et al. |
| 2009/0006808 A1 | 1/2009 | Blumrich et al. |
| 2009/0036171 A1 | 2/2009 | Palenius |
| 2009/0063419 A1 | 3/2009 | Nurminen et al. |
| 2009/0067322 A1 | 3/2009 | Shand et al. |
| 2009/0092124 A1 | 4/2009 | Singhal et al. |
| 2009/0141621 A1 | 6/2009 | Fan et al. |
| 2009/0204320 A1* | 8/2009 | Shaffer et al. .................. 701/202 |
| 2009/0234933 A1 | 9/2009 | Fein et al. |
| 2009/0238167 A1 | 9/2009 | Fein et al. |
| 2009/0254567 A1 | 10/2009 | Fein et al. |
| 2009/0300635 A1 | 12/2009 | Ferris |
| 2010/0185581 A1 | 7/2010 | Bakalash |
| 2011/0125721 A1 | 5/2011 | Fein |
| 2011/0138075 A1 | 6/2011 | Fein |
| 2011/0167131 A1 | 7/2011 | Fein |
| 2011/0179131 A1 | 7/2011 | Fein |

FOREIGN PATENT DOCUMENTS

| | | |
|---|---|---|
| EP | 1 048 998 | 11/2000 |
| EP | 1 968 257 | 9/2003 |
| EP | 1 357 476 A | 10/2003 |
| EP | 1406446 A1 | 4/2004 |
| EP | 1 802 051 | 11/2006 |
| EP | 1322068 B1 | 11/2006 |
| EP | 1 746 790 | 1/2007 |
| EP | 1 372 316 | 5/2007 |
| EP | 1798934 A1 | 6/2007 |
| EP | 1798937 A1 | 6/2007 |

| | | |
|---|---|---|
| EP | 1826968 A1 | 8/2007 |
| EP | 1485787 B1 | 10/2007 |
| EP | 1776639 B1 | 12/2007 |
| EP | 1479236 B1 | 1/2008 |
| EP | 1 931 090 | 6/2008 |
| JP | 56-116144 | 9/1981 |
| JP | 56-116145 | 9/1981 |
| JP | 61-165889 | 7/1986 |
| JP | 06-068047 | 3/1994 |
| JP | 10-254761 | 9/1998 |
| JP | 11-065911 | 3/1999 |
| JP | 2002-268952 | 9/2002 |
| JP | 2003-296176 | 10/2003 |
| JP | 2003-296179 | 10/2003 |
| JP | 2005-070987 | 3/2005 |
| JP | 2005-216241 | 8/2005 |
| JP | 2005-310126 | 11/2005 |
| JP | 2005-339325 | 12/2005 |
| JP | 2007-310673 | 11/2007 |
| JP | 2008-052340 | 3/2008 |
| JP | 2011-519097 | 6/2011 |
| WO | WO 94/04991 | 3/1994 |
| WO | WO 01/67303 | 9/2001 |
| WO | WO 02/052417 | 7/2002 |
| WO | WO 2004/059529 | 7/2004 |
| WO | WO 2005/062578 | 7/2005 |
| WO | WO 2006/115594 | 11/2006 |
| WO | WO 2006/124084 | 11/2006 |
| WO | WO 2006/124217 | 11/2006 |
| WO | WO 2007/001631 | 1/2007 |
| WO | WO 2007/031593 | 3/2007 |
| WO | WO 2008/006079 | 1/2008 |
| WO | WO 2008/070958 | 6/2008 |
| WO | WO 2008/094930 | 8/2008 |
| WO | WO 2008/108699 | 9/2008 |
| WO | WO 2008/109390 | 9/2008 |
| WO | WO 2009/021289 | 2/2009 |
| WO | WO 2009/117259 | 9/2009 |
| WO | WO 2009/126418 | 10/2009 |
| WO | WO 2009/132345 | 10/2009 |
| WO | WO 2009/137571 | 11/2009 |
| WO | WO 2010/005928 | 1/2010 |
| WO | WO 2010/005935 | 1/2010 |
| WO | WO 2010/014368 | 2/2010 |
| WO | WO 2010/036712 | 4/2010 |
| WO | WO 2010/036881 | 4/2010 |
| WO | WO 2010/036883 | 4/2010 |
| WO | WO 2010/036886 | 4/2010 |
| WO | WO 2010/036887 | 4/2010 |
| WO | WO 2010/036891 | 4/2010 |

OTHER PUBLICATIONS

Amazon Elastic Compute Cloud (Amazon EC2)—Limited Beta, Amazon.com: Amazon EC2, Amazon Elastic Compute Cloud, Virtual Grid Computing: . . . p. 1 of 9, http://web.archive.org/web/20070705164650rn_2/www.amazon.com/b?ie=UTF8&node=2 . . . Jun. 18, 2010.
Aref, et al.: "Nile: A Query Processing Engine for Data Streams", Department of Computer Sciences Purdue University, West Lafayette, IN., USA, Data Engineering, 2004. Proceedings. 20th International Conference on Mar. 30-Apr. 2, 2004.
Ari, Ismail: "Design and Management of Globally-Distributed Network Caches", University of California Santa Cruz, Sep. 2004, 220 pages.
Cheeha Kim, "An Efficient Multicast Data Forwarding Scheme for Mobile Ad Hoc Networks", Information Networking, Convergence in Broadband and Mobile Networking, International Conf., Lecture Notes in Computer Science, Jan. 31-Feb. 2, 2005, vol. 3391/2005, 510-519, DOI: 10.1007/978-3-540-30582-8_53.
EPO Exam Report re App. No. 09723251.6, dated Nov. 11, 2010.
Ertaul et al.: "ECC Based Threshold Cryptography for Secure Data Forwarding and Secure Key Exchange in MANET (I)", LNCS 3462, pp. 102-113, Networking 2005, May 2-6, 2005 University of Waterloo, Waterloo Ontario Canada.
Ertaul et al: "Implementation of Homomorphic Encryption Schemes for Secure Packet Forwarding in Mobile Ad Hoc Networks (MANETs)", IJCSNS, vol. 7, Issue No. 11, pp. 132-141, Nov. 2007.
Girao et al.: "TinyPEDS: Tiny Persistent Encrypted Data Storage in Asynchronous Wireless Sensor Networks", Ad Hoc Networks, vol. 5, Issue 7, p. 1073-1089 (Sep. 2007).
Hoke, et al.: "InteMon: Continuous Mining of Sensor Data in Large-scale Self- Infrastructures", Carnegie Mellon University. Appears in ACM SIGOPS Operating Systems Review, 40(3): pp. 38-44. ACM Press, Jul. 2006.
Huang et al., "Secure Data Forwarding in Wireless Ad Hoc Networks", IEEE International Conference, May 16-20, 2005, pp. 3535-3531, vol. 5.
Ito, Takeshi et al.,, "Technologies of ETERNUSVS900 Storage Virtualization Switch", Fujitsu Sci. Tech. J., Jan. 2006, vol. 42, Issue 1, pp. 17-23.
Ji, Lusheng et al., "On Providing Secure and Portable Wireless Data Networking Services: Architecture and Data Forwarding Mechanisms", IPSJ Journal, Oct. 2004, vol. 45, Issue 10, pp. 2261-2269.
Kim, Youngmin, "An Efficient Multicast Data Forwarding Scheme for Mobile Ad Hoc Networks", Information Networking, Convergence in Broadband and Mobile Networking, International Conf., 2005, vol. ICOIN 2005, Jeju Island, Korea, Jan. 31-Feb. 2, 2005.
Komandur et al., "SPAM: A Data Forwarding Model for Multipoint-to-Multipoint Connection Support in ATM Networks", IC3N, IEEE Computer Society, Sep. 1997, pp. 1-7.
Mellor, Chris: "Storage in the cloud—Doppler shift or marketing gloss?", Storage in the cloud—Feature—Techworld.com, Published: 12:00, Dec. 18, 2007, http://features.techworld.com/storage/3893/storage-in-the-cloud/.
PCT International Preliminary Report and Report on Patentability re App. No. PCT/US2009/49763, dated Jan. 20, 2011.
PCT International Preliminary Report on Patentability and Written Opinion re App. No. PCT/US2009/041817, dated Oct. 26, 2010.
PCT International Preliminary Report on Patentability and Written Opinion re App. No. PCT/US2009/042971, dated Nov. 9, 2010.
PCT International Preliminary Report on Patentability and Written Opinion re App. No. PCT/US2009/49755, dated Jan. 20, 2011.
PCT International Preliminary Report on Patentability and Written Opinion re App. No. PCT/US2009/58052, dated Mar. 29, 2011.
PCT International Preliminary Report on Patentability and Written Opinion re App. No. PCT/US2009/58364, dated Mar. 29, 2011.
PCT International Preliminary Report on Patentability and Written Opinion re App. No. PCT/US2009/58367, dated Mar. 29, 2011.
PCT International Preliminary Report on Patentability and Written Opinion re App. No. PCT/US2009/58368, dated Mar. 29, 2011.
PCT International Preliminary Report on Patentability and Written Report re App. No. PCT/US2009/58376, dated Mar. 29, 2011, mailed on Apr. 7, 2011.
PCT International Report on Patentability and Written Opinion Re PCT/US2009/036171 dated Sep. 21, 2010.
PCT International Report on Patentability and Written Opinion re PCT/US2009/037579, dated Oct. 12, 2010.
PCT International Report on Patentability re App. No. PCT/US2009/50008, dated Feb. 10, 2011.
PCT International Search Report and Written Opinion, PCT/US2009/036171, dated Sep. 4, 2009 in 13 pgs.
PCT International Search Report and Written Opinion, PCT/US2009/037579, dated Jun. 24, 2009, 12 pages.
PCT International Search Report re App. No. PCT/US2009/41817, dated Jun. 30, 2009.
PCT International Search Report re App. No. PCT/US2009/42971, dated Jun. 24, 2009.
PCT International Search Report re App. No. PCT/US2009/49755, dated Aug. 7, 2009.
PCT International Search Report re App. No. PCT/US2009/49763, dated Oct. 16, 2009.
PCT International Search Report re App. No. PCT/US2009/50008, dated Aug. 11, 2009.
PCT International Search Report re App. No. PCT/US2009/58052, dated Nov. 4, 2009.
PCT International Search Report re App. No. PCT/US2009/58362, dated Nov. 2, 2009.
PCT International Search Report re App. No. PCT/US2009/58368, dated Oct. 26, 2009.

PCT International Search Report re App. No. PCT/US2009/58376, dated Oct. 28, 2009.
PCT International Search Report, re App. No. PCT/US2009/58364, dated Nov. 4, 2009.
PCT International Search Report, re App. No. PCT/US2009/58367, dated Oct. 26, 2009.
Sharma, et al.: "Data Warehouse and Olap Technology Part -1", power point presentation, first cited on Sep. 29, 2008 in U.S. Appl. No. 12/241,003.
Stefansson, et al.: "MyriadStore: Technical Report", Swedish Institute of Computer Science (SICS), Technical Report T2006:09, ISSN 1100-3154, ISRN: SCIS-T02006/09-SE. May 3, 2006 in 13 pages.
U. S. Non-Final Office Action mailed May 14, 2009, re U.S. Appl. No. 12/132,804.
U. S. Notice of Allowance mailed Aug. 7, 2008, re U.S. Appl. No. 12/046,757.
U. S. Notice of Allowance mailed Jul. 15, 2009, re U.S. Appl. No. 12/132,804.
U. S. Notice of Allowance mailed Jul. 26, 2010, re U.S. Appl. No. 12/240,802.
U. S. Notice of Allowance mailed Sep. 15, 2010, re U.S. Appl. No. 12/099,498.
U. S. Office Action re U.S. Appl. No. 12/240,757, dated Jun. 22, 2009.
U.S. Non-Final Office Action mailed Apr. 16, 2010, re U.S. Appl. No. 12/099,498.
Wagner, et al.: "A Network Application Programming Interface for Data Processing in Sensor Networks", Rice University Technical Report TREE0705. 10 pages, Submitted to IPSN (Jan. 2007)—http://www.citeulike.org/user/leosteinfeld/article/5146294.
European Extended Search Report, re EP Application No. 09816904.8, dated Feb. 6, 2012.
European Extended Search Report, re EP Application No. 09795041, dated Oct. 11, 2011.
Japanese Office Action dated Apr. 13, 2012, re JP App. No. 2011-517515.
U.S. Notice of Allowance re U.S. Appl. No. 12/052,345, dated Apr. 2, 2012.
Japanese Office Action re JP Application No. 2011-529255, dated Apr. 26, 2012.
Japanese Office Action, re JP App. No. 2011-529258, dated Apr. 26, 2012.
Purczynski, et al.: "Juggling with packets: floating data storage," Internet Archive, Oct. 2003. [retrieved on Apr. 25, 2012]. Retrieved from the Internet: <URL: http://web.archive.org/web/20031017082346/http://lcamtuf.coredump.cx/juggling_with_packets.txt>.
Japanese Office Action, re JP Application No. 2011-504044, dated Sep. 4, 2012.
Australian Office Action re AU Application No. 2009240392, dated May 1, 2012.
Australian Office Action re AU Application No. 2009268792, dated Jun. 8, 2012.
Australian Office Action, re AU Application No. 2009296496, dated May 23, 2012.
Japanese Office Action (Notice of Rejection), re JP Application No. JP 2011-500858, dated May 29, 2012.
Japanese Office Action re JP Application No. JP 2011-521163, dated May 23, 2012.
Korean Office Action, re KR Application No. 10-2011-7000703, dated Jul. 16, 2012.
Wojciech Purczynski et al.: "Juggling with packets: floating data storage," Internet Archive, Oct. 2003. [retrieved on Apr. 25, 2012]. Retrieved from the Internet<URL: http://web.archive.org/web/20031017082346/http://lcamtuf.coredump.cx/juggling_with_packets.txt.
Pakkala, D. et al.: "Towards a Peer-to-Peer Extended Content Delivery Network", pp. 1-5, XP002615892, retrieved from the Internet: Url:http://www.eurasip.org/Proceedings/Ext/IST05/papers/99.pdf on Jan. 7, 2011.
Pierre, G. et al.: "Globule: A Collaborative Content Delivery Network", IEEE Communications Magazine, vol. 44, No. 8, Aug. 1, 2006, pp. 127-133.
Tanenbaum, Andrew S.: "Network Protocols", Computing Surveys, vol. 13, No. 4, Dec. 1, 1981, pp. 453-489.
Australian Office Action, re Au Application No. 2009-268716, dated Feb. 29, 2012.
Japanese Office Action, re JP Application No. 2011-506496, dated Mar. 21, 2012.
U.S. Notice of Allowance re U.S. Appl. No. 12/052,345, dated Dec. 29, 2011.
European Office Action, re EP Application No. 09795041, dated Aug. 9, 2012.
U. S. Office Action re U.S. Appl. No. 13/003,505, dated Aug. 22, 2012.
U.S. Interview Summary mailed Aug. 6, 2012, re U.S. Appl. No. 12/991,383.
U.S. Interview Summary mailed Aug. 6, 2012, re U.S. Appl. No. 13/057,072.
U.S. Interview Summary mailed Aug. 6, 2012, re U.S. Appl. No. 13/119,124.
U.S. Interview Summary mailed Aug. 7, 2012, re U.S. Appl. No. 13/003,502.
U.S. Interview Summary mailed Aug. 7, 2012, re U.S. Appl. No. 13/119,122.
U.S. Interview Summary mailed Aug. 7, 2012, re U.S. Appl. No. 13/119,147.
U.S. Interview Summary re U.S. Appl. No. 13/119,133, dated Aug. 7, 2012.
U.S. Notice of Allowance mailed Aug. 31, 2012, re U.S. Appl. No. 13/119,133.
U.S. Office Action re U.S. Appl. No. 12/052,345, dated Oct. 4, 2011.
EPO, Extended Search Report re EPO App. No. 09734559.9, dated Jul. 25, 2011.

* cited by examiner

REAL-TIME COMMUNICATIONS OVER DATA FORWARDING FRAMEWORK

CROSS REFERENCE TO RELATED APPLICATIONS

This application is a U.S. National Phase of International Application No. PCT/US2009/041817, filed Apr. 27, 2009 which is a continuation of U.S. patent application Ser. No. 12/109,458, filed Apr. 25, 2008, entitled "REAL-TIME COMMUNICATIONS OVER DATA FORWARDING FRAMEWORK," each of which is hereby expressly incorporated by reference in its entirety.

BACKGROUND

The present disclosure relates to data processing by digital computer, and more particularly to real-time communications over data forwarding framework.

Instant Messaging (IM) is a form of real-time communication between two or more people based on typed text. The text is conveyed using computers connected over a network such as the Internet. IM enables instantaneous communication between a number of parties simultaneously, by transmitting information quickly. Some IM systems enable users to use webcams and microphones for real-time conversations. In addition IM has additional features such as the immediate receipt of acknowledgment or reply, group chatting, conference services (including voice and video), conversation logging and file transfer. For example, it is possible to save a conversation for later reference. Instant messages are typically logged in a local message history that closes the gap to the persistent nature of E-mails and facilitates quick exchange of information like universal resource locators (URLs) or document snippets (which can be unwieldy when communicated via telephone).

SUMMARY

The present invention provides methods and apparatus, including computer program products, for real-time communications over data forwarding framework.

In general, in one aspect, the invention features A method including receiving a request from a first user system linked to a network of interconnected computer system nodes to retrieve data being continuously forwarded from node memory to node memory in the network, the first user system executing a real-time communications client program that establishes a real-time communications session with a second user system executing a real-time communications client program, retrieving the data from node memory in response to the request from the first user system to retrieve data, and forwarding the retrieved data to the second user system.

In another aspect, the invention features a framework including a group of interconnected computer system nodes each adapted to receive data and continuously forward the data from computer memory to computer memory without storing on any physical storage device in response to a request from a client system to store data from a requesting system and retrieve data being continuously forwarded from computer memory to computer memory in response to a request to retrieve data from the requesting system, and at least two client systems linked to the group, each of the client systems executing a real-time communications client program.

Other features and advantages of the disclosure are apparent from the following description, and from the claims.

DETAILED DESCRIPTION

Unlike peer to peer networks, which use data forwarding in a transient fashion so that data is eventually stored on a physical medium such as a disk drive, the present invention enables social networking applications such as instant messaging to be supported by a continuously data forwarding framework, i.e., data is stored by continuously forwarding it from one node memory to another node memory in a network of nodes.

Figure 1:
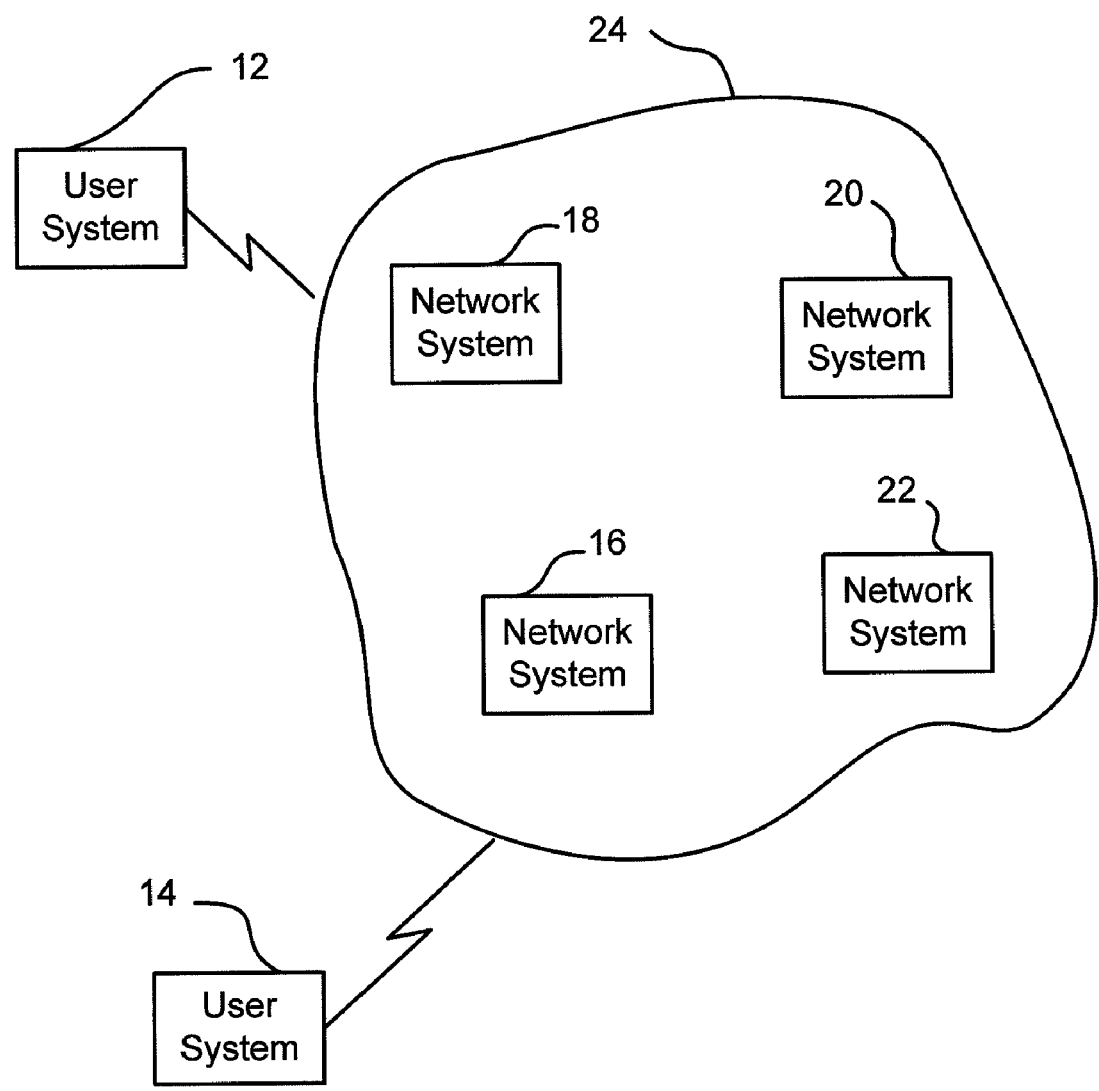
FIG. 1 is a block diagram of an exemplary framework.

As shown in FIG. 1, an exemplary continuously data forwarding framework 10 includes two user systems 12, 14 (also referred to as client systems) coupled to a number of network systems 16, 18, 20, 22 (also referred to as servers). Each of the network systems 16, 18, 20, 22 is considered to be a node in a network 24 and one such network system may be designated as a host or central server, such as network system 16. As such, network system 16 may assume a control position in network 24. Each of the nodes 16, 18, 20, 22 can be established as a privately controlled network of peers under direct control of the central server 16. Peered nodes can also be a mix of private and public nodes (e.g., the Internet), and thus not under the direct physical control of the central server 16. The network 24 can also be wholly public where the central server 16 (or servers) has no direct ownership or direct physical control of any of the peered nodes.

The continuously data forwarding framework 10 supports communications between computer users, such as users on user systems 12,14. Computer users on user systems 12, 14 are distributed geographically and communicate using one or more of the network systems 16, 18, 20, 22 in network 24. User systems 12, 14 are connected to network 24 through various communication mediums, such as a modem connected to a telephone line (using, for example, serial line internet protocol (SLIP) or point-to-point protocol (PPP)) or a direct internetwork connection (using, for example, transmission control protocol/internet protocol (TCP/IP)).

Each of the user systems 12, 14 may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. User systems 12, 14 may receive instructions from, for example, a software application, a program, a piece of code, a device, a computer, a computer system, or a combination thereof, which independently or collectively direct operations, as described herein. These instructions may take the form of one or more communications programs that facilitate communications between the users of client systems 12, 14. For instance, such communications programs may include E-mail programs, Instant Messaging (IM) programs, File Transfer Protocol (FTP) programs, Voice-over-Internet (VoIP) programs, as so forth. The instructions may be embodied permanently or temporarily in any type of machine, component, equipment, storage medium, or propagated signal that is capable of being delivered to the client systems 12, 14.

Clients systems 12, 14 include a communications interface (not shown) used by the communications programs to send communications through network 24. The communications may include E-mail, audio data, video data, general binary data, or text data (e.g., encoded in American Standard Code for Information Interchange (ASCII) format).

The network 24 can include a series of portals interconnected through a coherent system. Examples of the network 24 include the Internet, Wide Area Networks (WANs), Local Area Networks (LANs), analog or digital wired and wireless telephone networks (e.g. a Public Switched Telephone Network (PSTN)), an Integrated Services Digital Network (ISDN), a Digital Subscriber Line (xDSL)), or any other wired or wireless network. The network 24 may include multiple networks or sub-networks, each of which may include, for example, a wired or wireless data pathway.

A host server 16 may be connected to network 24 and may be used to facilitate some direct or indirect communications between the client systems 12, 14. As with the client systems 12, 14, host server 16 may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. Host server 16 may receive instructions from, for example, a software application, a program, a piece of code, a device, a computer, a computer system, or a combination thereof, which independently or collectively direct operations, as described herein. These instructions may take the form of one or more communications programs. For instance, such communications programs may include E-mail programs, IM programs, FTP programs, VoIP programs, and so forth. The instructions may be embodied permanently or temporarily in any type of machine, component, equipment, storage medium, or propagated signal that is capable of being delivered to the host server 16.

Further, host server 16 includes a communications interface (not shown) used by the communications programs to send communications through network 24. The communications may include E-mail, audio data, video data, general binary data, or text data (e.g., encoded in American Standard Code for Information Interchange (ASCII) format).

The user systems 12, 14 can execute an instant messaging (IM) client program. IM programs typically enable users to communicate in real-time with each other in a variety of ways. Most IM programs provide, for example:

(1) Instant messages—send notes back and forth with a friend who is online (2) Chat—create a chat room with friends or co-workers (3) Web links—share links to your favorite Web sites (4) Video—send and view videos, and chat face to face with friends (5) Images—look at an image stored on your friend's computer (6) Sounds—play sounds for your friends (7) Files—share files by sending them directly to your friends (8) Talk—use the Internet instead of a phone to actually talk with friends (9) Streaming content—real-time or near-real-time stock quotes and news

(10) Mobile capabilities—send instant messages from your cell phone

Examples of IM communications include those provided by AIM (America Online® Instant Messenger), Yahoo® Messenger, MSN® Messenger, and ICQ®, and so forth.

The framework 10 supports these IM communications and enables users to store video, images, sounds, files and other content, which can be included in IM communications.

Unlike other systems, such as data storage networks, the framework 10 does not use fixed physical data storage to store data, such as image files and video files, for example. When a request to store data is received by the central server 16 from one of the user systems 12, 14, data is directed to a node in the network 24 where it is then continuously forwarded from node memory to node memory in the network 24 without storing on any physical storage medium such as a disk drive. The forwarded data resides only for a very brief period of time in the memory of any one node in the network 24. Data is not stored on any physical storage medium in any network node.

In a like manner, when a request to retrieve data is received by the central server 16 from a user system 12, 14, the requested data, which is being forwarded from node memory to node memory in the network 24, is retrieved.

Data forwarded in this manner can be segmented and segments forwarded as described above. Sill, the segmented data is not stored on any physical storage medium in any network node, but merely forwarded from the memory of one node to the memory of another node.

Figure 2:
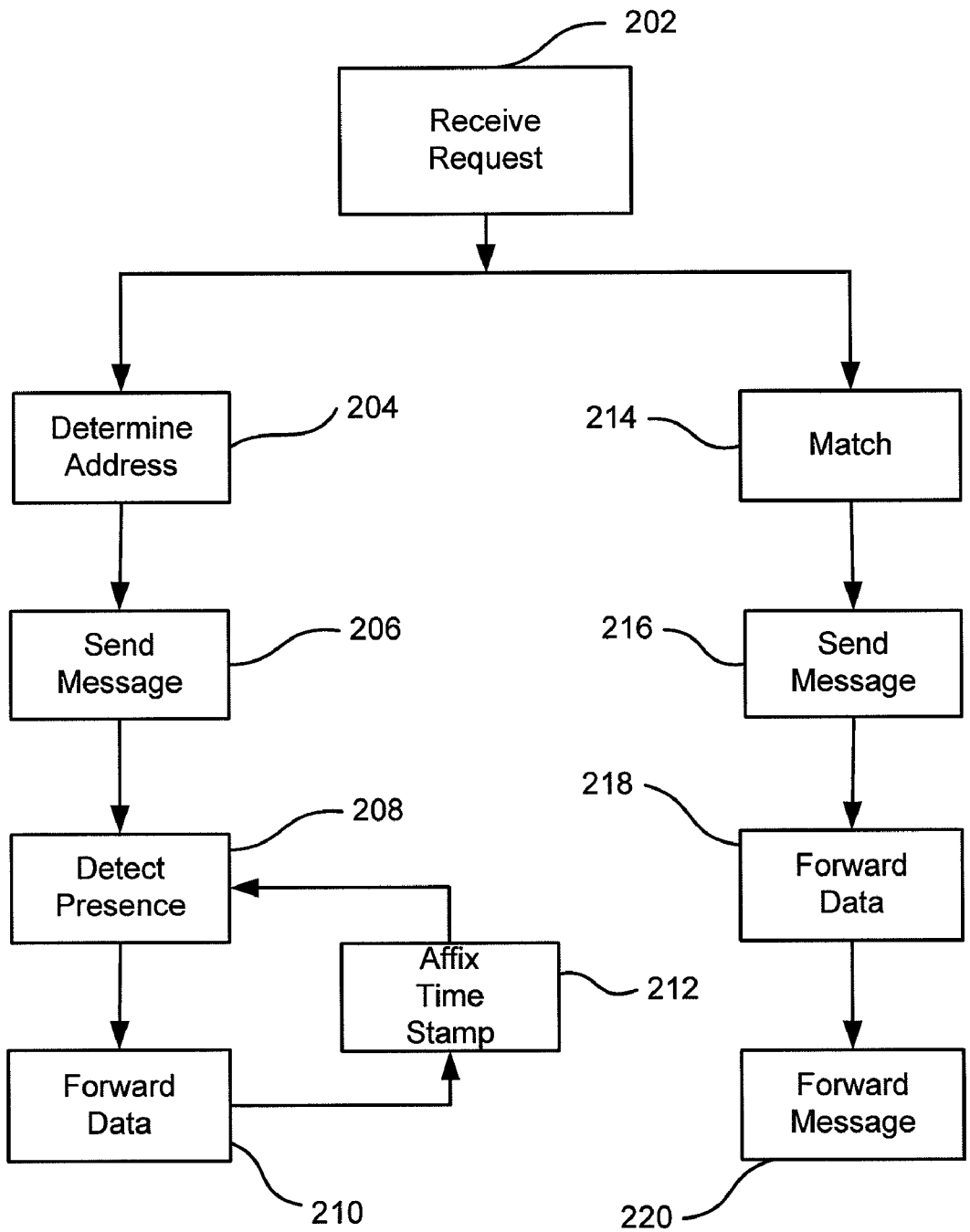
FIG. 2 is a flow diagram.

FIG. 2 illustrates a process 200 that resides on each of the network nodes 16, 18, 20, 22 that facilitates data forwarding. Process 200 includes receiving (202) a request from a user system to store or retrieve data. If the received request is a request to store data, process 200 determines (204) an address of a node available to receive the data in memory. This determination (204) can include pinging the network and determining which of the nodes in a network is available, or determining which node in the network has the least traffic, or determining which node in the network has the largest available memory, or any combination of these or other factors.

Process 200 sends (206) a message to the user system with the address of a specific node for the requester to forward the data.

Process 200 detects (208) the presence of data in node memory. Process 200 forwards (210) the data in memory to another node in the network of nodes and continues to repeat detecting (208) and forwarding (210) of the data from node memory to node memory. When data arrives in any node memory, process 200 affixes (212) a time stamp to the data. Additionally, as data enters and exits any mode memory, the data may be encrypted and de-encrypted.

Forwarding (210) can include pinging the node in the network to determine which of the nodes in the network is available, or determining which node in the network has the least traffic, or determining which node in the network has the largest available memory, or any combination of these or other factors.

In one specific example, at the point of entry to a node, data undergoes an encrypted "handshake" with the node or central server 16 or user. This can be a public or private encryption system, such as the Cashmere system, which can use public-private keys. Cashmere decouples the encrypted forwarding path and message payload, which improves the performance as the source only needs to perform a single public key encryption on each message that uses the destination's unique public key. This has the benefit that only the true destination node will be able to decrypt the message payload and not every node in the corresponding relay group. Cashmere provides the capability that the destination can send anonymous reply messages without knowing the source's identity. This is done in a similar way, where the source creates a reply path and encrypts it in a similar manner as the forwarding path.

In another example, other routing schemes are utilized.

If the received request is a request to retrieve data being continuously forwarded from node memory to node memory, process 200 matches (214) at the central server 16 using a hash mark or other unique code that can be "sniffed" by the node upon the data entering the node via the encryption handshake. This can occur by pinging the nodes in the network. Process 200 sends (216) the message to return the data to the user directly to the node or node state where the central server 16 believes the data will likely appear. The more the central server 16 can narrow the node state that it pings to, then the more efficient the retrieval will become and the less burdened by unnecessary messaging traffic to nodes that are not necessary for a transaction between the central server 16 and the node capable of forwarding the data.

Once the correct node receives the message to forward the data in node memory to the requester, process 200 forwards (218) the data in node memory to the requester and forwards (220) a confirmation message that the data has been sent to the user. This routing message may be sent directly to the central server 16 or may be passed to the central server 16 or servers via other node(s) or supernode(s) in the network 24. Upon the user receiving the requested data the user's application functions to automatically ping the central server 16 that the data requested has been received. Thus the network 24 creates data storage without caching, downloading and/or storing the data on any physical storage medium. Data storage and management is accomplished via a continuously routing of the data from node memory to node memory.

New nodes and node states may be added and/or deleted from the network 24 based upon performance. Users may have access to all nodes or may be segmented to certain nodes or "node states" by the central server(s) or via the specific architecture of the private, public or private-public network.

Individual nodes, nodes states and supernodes may also be extranet peers, wireless network peers, satellite peered nodes, Wi-Fi peered nodes, broadband networks, and so forth, in public or private networks. Peered nodes or users may be used as routing participants in the network 24 from any valid peer point with the same security systems employed, as well as custom solutions suitable for the rigors of specific deployments, such as wireless encryption schemes for wireless peers, and so forth.

In process 200, rather than have data cached or held in remote servers, hard drives or other fixed storage medium, the data are passed, routed, forwarded from node memory to node memory. The data are never downloaded until the authorized user calls for the data. A user on the system may authorize more than one user to have access to the data.

A primary goal in process 200 is to generate a data storage and management system where the data is never fixed in physical storage, but in fact, is continuously being routed/forwarded from node memory to node memory in the network. The path of the nodes to which data is forwarded may also be altered by the central server 16 to adjust for system capacities and to eliminate redundant paths of data that may weaken the security of the network due to the increased probability of data path without this feature.

Figure 3:
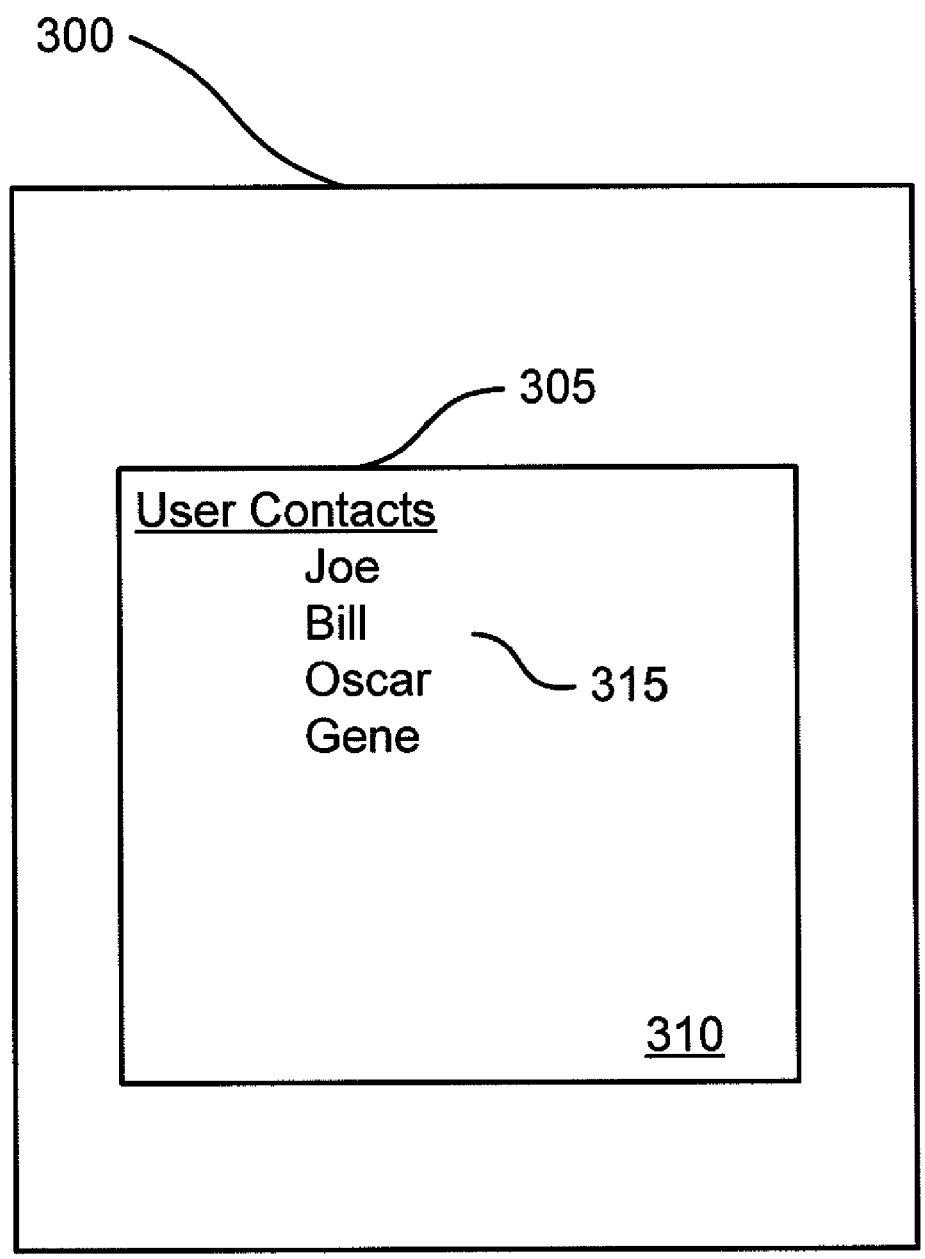
FIG. 3 is an exemplary instant messaging user interface.
Like reference numbers and designations in the various drawings indicate like elements.

FIG. 3 illustrates an example interface presented to a user of one of the client systems 12, 14 when running an instant messaging client program. As described above, instant messaging programs typically enable users to communicate in real-time with each other in a variety of ways. For example, many instant messaging programs enable users to send text as an instant message, to transfer files, and to communicate by voice.

Shown is a desktop 300 with a user interface 305 of the instant messaging client program. User interface 305 has a text box 310 that displays representations 315 of the program user's contacts or buddies (both terms are used interchangeably herein), which are other users of an instant messaging program with whom the program user desires to communicate and interact. The representations 315 may provide contextual information to the program user about the buddy, such as whether the contact is online, how long the contact has been online, whether the contact is away, or whether the contact is using a mobile device.

The list of contacts displayed in text box 310 of user interface 305 typically is referred to as the contact list or buddy list. The IM program user can typically add or remove contacts from the contact list. In the example shown, the representations 315 are text icons showing the screen names of the contacts.

Instant messaging programs may use an instant messaging server to assist in communications between users of the instant messaging program. The instant messaging server may be implemented, for example, using host server 16. When a user is connected to the network and executes the instant messaging program, the instant messaging program contacts the host server 16 and logs the user onto the host server 16. The host server 16 informs the instant messaging program when the program user's contacts are online and facilitates communications between the program user and an online contact.

The host server 16 may support IM services irrespective of a program user's network or Internet access. Thus, host server 16 may enable users to send and receive IMs, regardless of whether they have access to any particular Internet service provider (ISP). The host server 16 also may support associated services, such as administrative matters, advertising, directory services, chat, and interest groups related to IM. To transfer data, the host server 16 employs one or more IM protocols.

To begin an IM session, the IM client program running on a client system 12, 14 establishes a connection with the host server 16 and logs onto the host server 16. Once a session is established, a user can use the IM client program to view whether particular buddies are online, exchange IMs with particular buddies, participate in group chat rooms, trade files such as pictures, invitations or documents. The IM program user also may be able to find other buddies with similar interests, get customized information such as news and stock quotes, and search the World Wide Web.

Host server 16 may assist IM communications between users of IM client programs by facilitating the establishment of a peer-to-peer communication session between the IM client programs. Or the host server 16 may assist IM communications by directly routing communications between the IM client programs.

When a contact is online, the IM program user can communicate or interact with the contact in a number of ways. For instance, the IM program user can send an instant message to the contact (typically in the form of text).

Sending a message opens up a window in which messages can be typed back-and-forth between the IM program user and the contact. Similarly, the IM program user also can send a file or other content to the contact.

To initiate these actions for a contact, the IM program user performs operations on the representation of the contact displayed in user interface 305. The program then executes the corresponding action in response to the operation performed on the representation. For example, an instant message might be initiated by double-clicking on a contact's representation. Or, a file transfer might be initiated by the IM program user selecting the contact's representation to bring up a context menu and choosing "send a file" from the menu.

Other actions can be executed in response to operations performed on the representation of the contact displayed in interface 305. For instance, a "buddy icon" can be set for the contact such that communications with the contact display the buddy icon. In addition, for example, profile information about the contact can be retrieved, an alert can be set to inform the program user when the contact is online, a VoIP communication session can be established, or an e-mail can be sent.

User interface 305 may have icons 330 to help a user set various options or perform operations in the instant messaging program.

The techniques described above are not limited to any particular hardware or software configuration. Rather, they may be implemented using hardware, software, or a combination of both. The programs may be implemented in a high-level programming language and may also be implemented in assembly or other lower level languages, if desired. Any such program will typically be stored on a computer-usable storage medium or device (e.g., CD-ROM, RAM, or magnetic disk). When read into the processor of the computer and executed, the instructions of the program cause the programmable computer to carry out the various operations described.

Furthermore, while the techniques have been described primarily with IM applications, they may be applied to other communications programs such as FTP programs, e-mail programs, voice-over-IP (VoIP) or other telephony programs, or players for streaming media.

It is to be understood that the foregoing description is intended to illustrate and not to limit the scope of the disclosure, which is defined by the scope of the appended claims. Other embodiments are within the scope of the following claims.

What is claimed is:

1. A method comprising:
    forwarding one or more data items between computing devices in communication via one or more networks without storing the forwarded one or more data items on any fixed storage medium in the one or more networks, wherein computing devices to which the one or more data items are respectively forwarded are dynamically determined based on statuses of respective computing devices and/or one or more statuses of the one or more networks;
    receiving a first request for a particular data item of the forwarded one or more data items from a first user computing device that is in real-time communication with a second user computing device via a real-time communication client, wherein the first request indicates that the particular data item be transmitted to the second user computing device;
    determining one or more computing devices within the network of computing devices to which the particular data item is likely currently being forwarded; and
    transmitting a second request for the particular data item to the determined one or more computing devices, wherein the second request comprises information regarding the second user computing device and an indication that the particular data item is to be transmitted to the second user computing device.

2. The method of claim 1, wherein said determining comprises:
    comparing a hash mark associated with the particular data item to hash marks associated with respective data items entering computing devices within the network.

3. The method of claim 1, further comprising:
    transmitting a confirmation message to the first user computing device indicating that the particular data item has been forwarded to the second user computing device.

4. The method of claim 1, further comprising receiving an acknowledgment from the second user computing device that the particular data item has been received.

5. The method of claim 1, wherein the particular data item comprises at least one of an audio file, an audiovisual file, an image file, a video file, a general binary data, or a text file.

6. The method of claim 1, wherein the real-time communication client comprises an instant messaging client program, an E-mail client program, a File Transfer Protocol (FTP) client program, or a Voice Over Internet Protocol (VoIP) client program.

7. A non-signal computer readable medium embodying instructions configured for execution by a computing system in order to cause the computing system to perform operations comprising:
    forwarding one or more data items between computing devices in communication via one or more networks without storing the forwarded one or more data items on any fixed storage medium in the one or more networks, wherein computing devices to which the one or more data items are respectively forwarded are dynamically determined based on statuses of respective computing devices and/or one or more statuses of the one or more networks;
    receiving a first request for a particular data item of the forwarded one or more data items in the network from a first user computing device that is in real-time communication with a second user computing device via a real-time communication client, wherein the first request indicates that the particular data item be transmitted to the second user computing device;
    determining one or more computing devices within the network of computing devices to which the particular data item is likely currently being forwarded; and
    transmitting a second request for the particular data item to the determined one or more computing devices, wherein the second request includes information regarding the second user computing device and an indication that the particular data item is to be transmitted to the second user computing device.

8. The non-signal computer readable medium of claim 7, wherein said determining comprises comparing a hash mark associated with the particular data item to hash marks associated with respective data items entering computing devices within the network.

9. The non-signal computer readable medium of claim 7, wherein the operations further comprise:
    transmitting a confirmation message to the first computing device indicating that the particular data item has been forwarded to the second user computing device.

10. The non-signal computer readable medium of claim 7 wherein the operations further comprise:
    receiving an acknowledgment from the second user computing device indicating that the particular data item has been received.

11. The non-signal computer readable medium of claim 7, wherein the particular data item comprises at least one of a audio file, audiovisual file, image file, video file, general binary data, or text file.

12. The non-signal computer readable medium of claim 7, wherein the real-time communication client comprises an instant messaging client program, an E-mail client program, a File Transfer Protocol (FTP) client program, or a Voice Over Internet Protocol (VoIP) client program.

13. A non-signal computer readable medium having instructions encoded thereon, the instructions configured for execution by a first computing system in order to cause the first computing system to perform operations comprising:

generating a user interface including controls for initiating real-time communication with a user of a second computing system, wherein the user interface includes controls for allowing a user of the first computing system to select a data item for transfer to the second computing system, wherein the selected data item is continuously forwarded between memories of computer nodes in communication via a network without being stored on any fixed storage medium in the network, and wherein computer nodes to which the selected data item is respectively forwarded are dynamically determined based on statuses of respective computer nodes and/or one or more statuses of the networks;

receiving a request via the user interface to transmit the selected data item to the second computing system; and transmitting, to one or more computer nodes to which the selected data item is likely currently being forwarded, a request for transmission of the selected data item to the second computing device.

14. The non-signal computer readable medium of claim 13, wherein the computer nodes are configured to detect presence of the selected data item, apply a time stamp, and forward the data item to another computer node according to an availability of the another computer node.

15. The non-signal computer readable medium of claim 13, wherein availability of respective computer nodes is determined based on at least a volume of network traffic.

16. The non-signal computer readable medium of claim 13 wherein the instructions cause the first computing device to provide one or more of an instant messaging client program, an E-mail client program, a File Transfer Protocol (FTP) client program, or a Voice Over Internet Protocol (VoIP) client program.

17. The non-signal computer readable medium of claim 13, wherein the data item includes at least one of a audio file, audiovisual file, image file, video file, general binary data, or text file.

18. A computing system comprising:

one or more hardware processors;

a computer readable medium storing instructions configured for execution by the one or more processors in order to cause the computing system to perform operations comprising:

forwarding one or more data items between computing devices in communication via one or more networks without storing the forwarded one or more data items on any fixed storage medium in the one or more networks, wherein computing devices to which the one or more data items are respectively forwarded are dynamically determined based on statuses of respective computing devices and/or one or more statuses of the one or more networks;

receiving a first request for a particular data item of the forwarded one or more data items in the network from a first user computing device that is in real-time communication with a second user computing device via a real-time communication client, wherein the first request indicates that the particular data item be transmitted to the second user computing device;

determining one or more computing devices within the network of computing devices to which the particular data item is likely currently being forwarded; and transmitting a second request for the particular data item to the determined one or more computing devices, wherein the second request includes information regarding the second user computing device and an indication that the particular data item is to be transmitted to the second user computing device.

\* \* \* \* \*

UNITED STATES PATENT AND TRADEMARK OFFICE
CERTIFICATE OF CORRECTION

| | | |
|---|---|---|
| PATENT NO. | : 8,386,585 B2 | Page 1 of 1 |
| APPLICATION NO. | : 12/989638 | |
| DATED | : February 26, 2013 | |
| INVENTOR(S) | : Fein et al. | |

It is certified that error appears in the above-identified patent and that said Letters Patent is hereby corrected as shown below:

On the Title Page, in Column 1, delete " (&54) " and insert -- (54) --, therefor.

On the Title Page, in the illustrative figure, insert main Designator -- 10 --.

In the Drawings:

In Fig. 1, Sheet 1 of 3, insert main Designator -- 10 --.

In the Specification:

In Column 4, Line 18, delete "Sill," and insert -- Still, --, therefor.

In the Claims:

In Column 8, Line 56, in Claim 10, delete "claim 7" and insert -- claim 7, --, therefor.

In Column 9, Line 33, in Claim 16, delete "claim 13" and insert -- claim 13, --, therefor.

Signed and Sealed this
Twelfth Day of August, 2014

Michelle K. Lee
*Deputy Director of the United States Patent and Trademark Office*